Oct. 6, 1931.  H. A. WADMAN  1,825,985
PARISON TRANSFER AND INVERSION MECHANISM AND METHOD
Filed Dec. 28, 1928   2 Sheets-Sheet 1

Witness:
Jas. G. White

Inventor
Harold A. Wadman
by Robert D. Brown
Attorney

Oct. 6, 1931. H. A. WADMAN 1,825,985
PARISON TRANSFER AND INVERSION MECHANISM AND METHOD
Filed Dec. 28, 1928   2 Sheets-Sheet 2
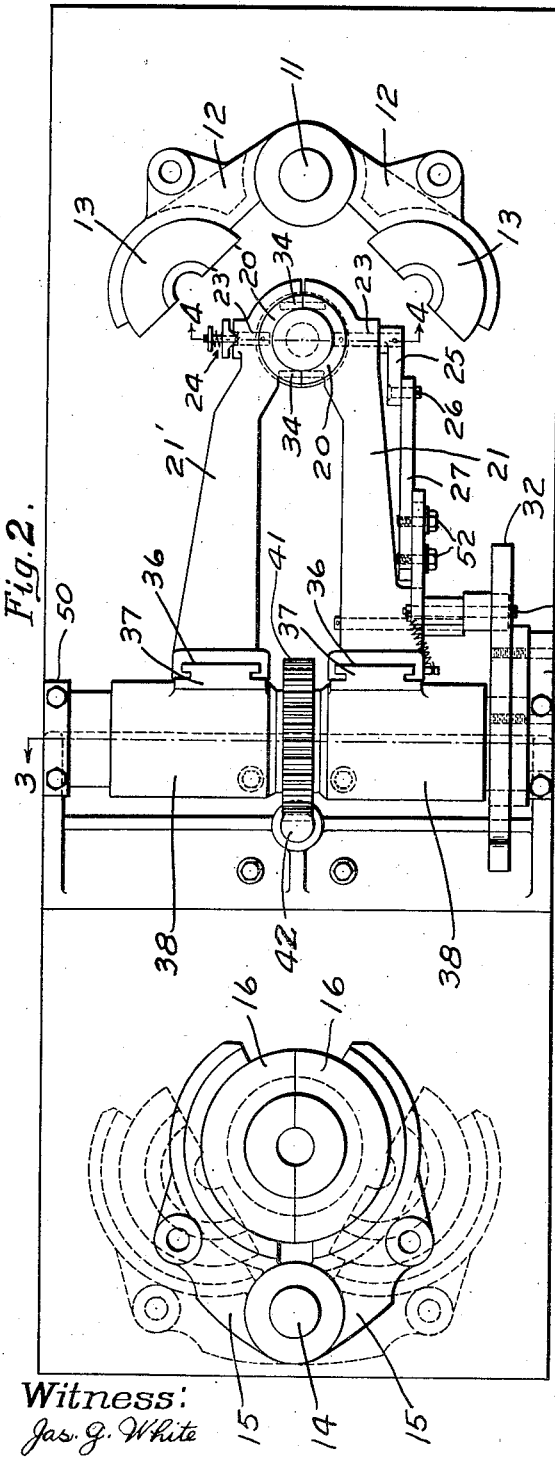
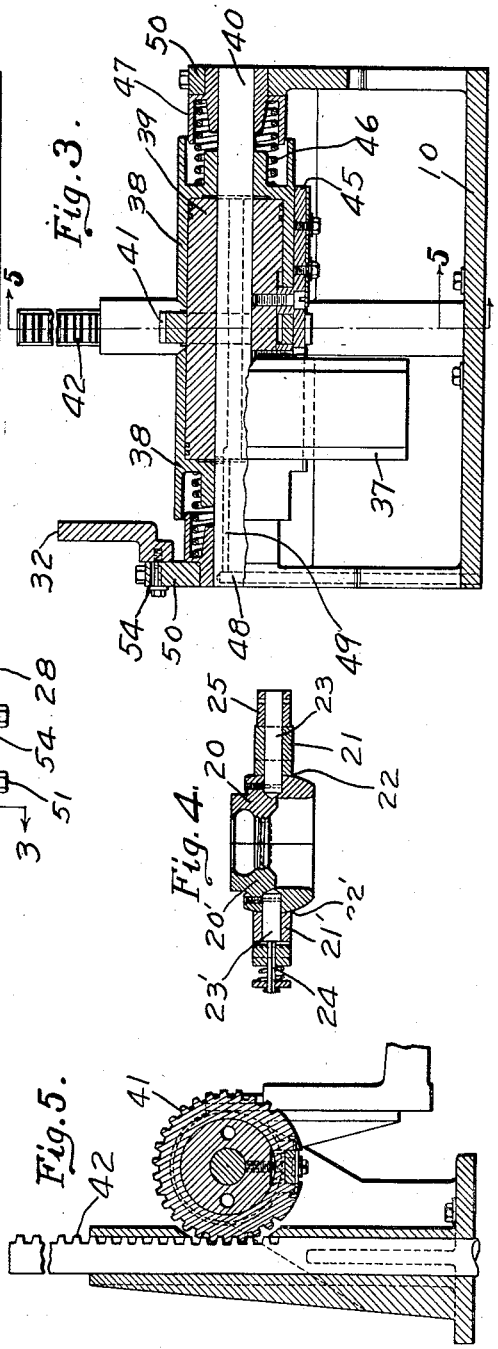
Inventor
Harold A. Wadman Patented Oct. 6, 1931

1,825,985

UNITED STATES PATENT OFFICE

HAROLD A. WADMAN, OF HARTFORD, CONNECTICUT, ASSIGNOR TO HARTFORD-EMPIRE COMPANY, OF HARTFORD, CONNECTICUT, A CORPORATION OF DELAWARE

PARISON TRANSFER AND INVERSION MECHANISM AND METHOD

Application filed December 28, 1928. Serial No. 329,065.

My invention relates to methods of and apparatus for the automatic manufacture of hollow glassware, such as bottles. It deals more particularly with the method and means of transferring a parison from a parison mold to a blow mold in which it is to be blown to final form.

My invention is particularly applicable to the type of bottle machine in which a parison is formed in a parison mold disposed in neck-down position, in which the parison so formed is blown to final form in a blow mold disposed in neck-up position, and in which the two molds are in fixed positions with respect to each other. A neck ring cooperating with both of these molds, serves to give the glass its neck or top finish and to transfer the parison from the parison mold to the blow mold. While the invention is not limited to any particular machine, it is peculiarly suited for application to the machine generally known to the glass art as the Hartford-Empire individual section machine, which machine is illustrated and described in the British Patent No. 257,637 to the Hartford-Empire Company. It is in connection with such a machine that the invention will be described herein.

An object of the invention is to transfer parisons formed in a parison mold to a blow mold by means of a neck ring which provides an "easy" or well balanced motion of inversion of the formed parison.

A further object of the invention is to provide mechanism which not only transfers and inverts the parison, but which may permit the elongation and reheating of the parison at a position remote from either of the molds, and while the parison is vertically disposed in neck-up position.

My invention may be embodied in a machine which comprises one or more units, each comprising a divided parison body mold arranged in neck-down position, a divided blow mold arranged in neck-up position, and a divided neck ring carried on an offset carrier, which is mounted for swinging movement about a horizontal axis intermediate of the parison and blow molds in such a manner that the neck ring is below the parison mold at one end of its movement and there cooperates with the parison mold in the formation of the parison, and is moved to a position above the blow mold carrying the formed parison to present the parison between the halves of the blow mold.

A parison is formed in the parison mold and neck ring, whereupon the parison mold is opened and the parison is transferred by the neck ring to the blow mold. During the transfer operation the parison is inverted. The movement of the inversion is balanced or is made "easy" by providing the locus of the center of inversion at or near the path of center of mass of the parison during the inverting movement. The inversion is accomplished partly by movement of the neck ring carrier and partly by specially provided means associated with the neck ring carrier. The apparatus may be so proportioned and regulated as to cause the inversion at any desired time during the transfer movement. By my novel arrangement the movement of the neck ring carrier about its axis may be made continuous or intermittent and at any desired speed or speeds so that a variety of effects upon the parison may be obtained. Thus the time and character of reheating and elongation of the parison while the parison is out of contact with either mold may be regulated and be made to take place in any desired position in its path of movement.

Other novel advantages of my invention will appear from the following specification and claims.

One embodiment of the mechanical features of my invention is illustrated in the accompanying drawings, in which:

Fig. 2 is a plan view of the parts shown in Fig. 1;

Fig. 3 is a section taken on the line 3—3 of Figs. 1 and 2;

Fig. 4 is a section taken on the line 4—4 of Fig. 2; and

Fig. 5 is a section taken on the line 5—5 of Fig. 3.

Figure 1:
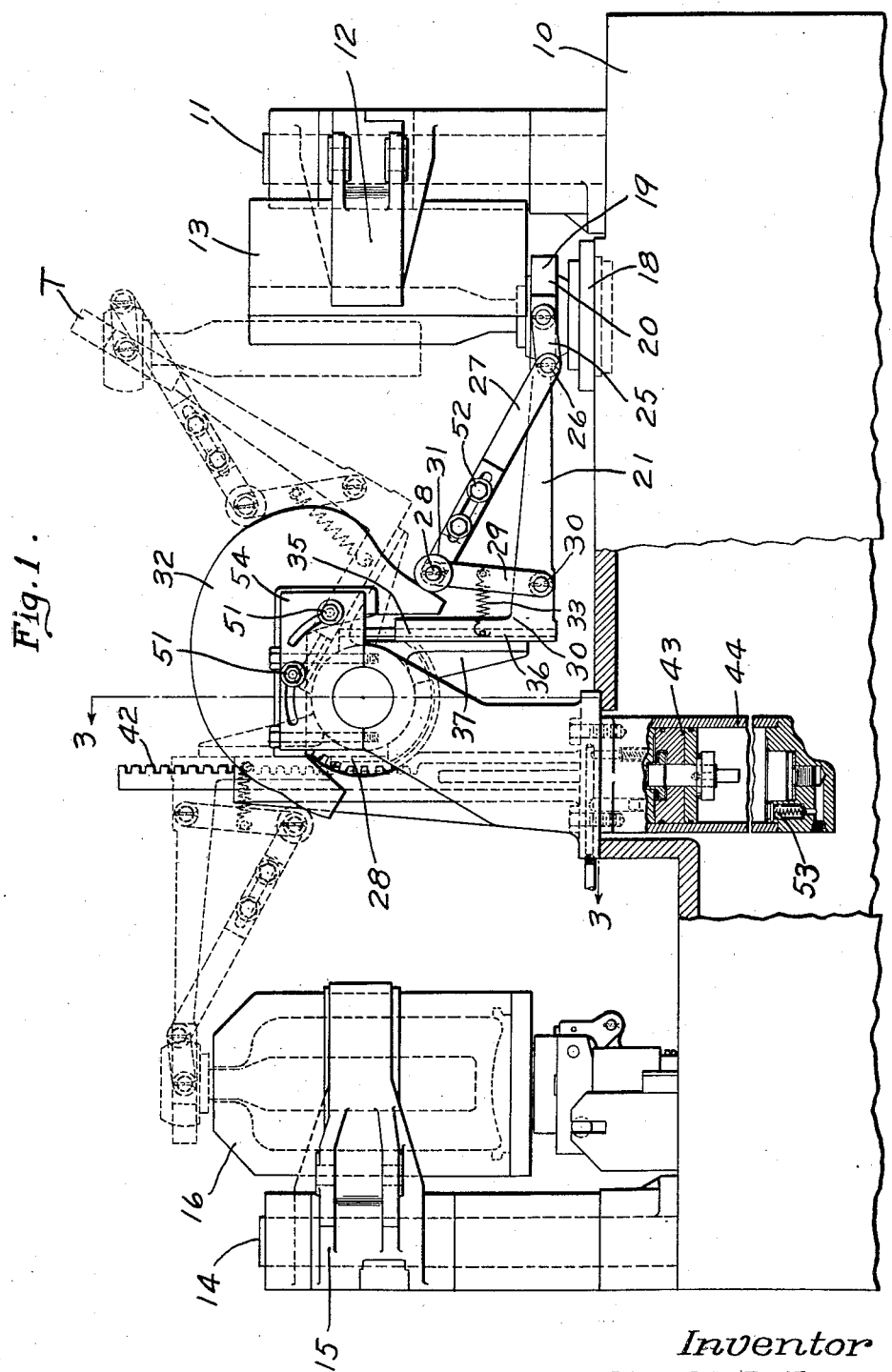
Figure 1 is a view partly in elevation and partly in vertical section of my novel transfer device and associated mold parts.

Referring to the drawings: 10 illustrates the box-like base of a bottle machine to which my invention is applied. This base contains suitable operating and timing mechanism (not shown), in general, similar to that disclosed in the British Patent No. 257,637 heretofore referred to. A post 11 arises from the base 10 and serves as a pivot for a pair of holders 12, which carry the halves 13 of a parison body mold. The halves 13 may be opened and closed at proper times by suitable mechanism (not shown). A second post 14 arises from the base 10 and serves as a pivot for a pair of holders 15 carrying the halves 16 of a blow mold. The blow mold halves are opened and closed at the proper times by suitable mechanism (not shown).

I contemplate operating the mechanism, here diagrammatically shown, by means similar to those shown in the aforesaid British patent, for opening and closing the parison and blow mold and providing similar means for guiding charges of glass into the parison mold, for settle blowing and counterblowing the glass to form a parison, for blowing the parison to final form in the blow mold, and for suitably and regulably timing these operations.

To impart the neck finish to the parison and to support it during transfer and inversion, I provide a neck mold or neck ring 19 comprising complementary halves 20 and 20' pivotally mounted in the carrier arms 21 and 21' respectively with which they form joints 22 and 22' having spherical contacting surfaces (Figs. 2 and 4). Pinned to the halves 20 and 20' respectively are stud shafts 23 and 23' which rotate in bearings formed in the arms 21 and 21'. The neck ring half 20' is maintained in proper assembled relation with the supporting arm 21' by providing suitable washers and a spring stop 24 on the stud shaft 23'. The shaft 23 extends through the arm 21 and carries a crank 25, the outer end of which is pivoted as at 26 to one end of an adjustable two-part link 27, the outer end of which carries a pivot shaft 28. The shaft 28 passes through one end of link 29, the opposite end of which is pivoted at 30 on the arm 21. A cam roller 31 is also mounted on the shaft 28 and is held against a stationary cam 32 by a spring 33. The neck ring halves are provided with a pair of long dowel connections 34, by which a driving connection is maintained between them even when the neck ring is opened.

Each of the arms 21 and 21' is L-shaped, the foot 35 of the L having an adjustable sliding connection 36 with an arm 37 which permits an adjustment of the effective length of the offset of the arms 21 or 21' and thus permits the use of the mechanism with molds of varying heights. Each arm 37 is integral with one of a pair of cylinders 38 which are mounted in opposed relation on a piston 39 on which the cylinders may slide endwise, but with which they rotate about a fixed shaft 40. The ends of the shaft are journaled in brackets 50 rising from the base 10. A segmental ring gear 41 is mounted on the piston 39 and is keyed, as by key 45, to the cylinders 38. The gear is in mesh with a rack 42 formed on the piston rod of a piston 43, which is mounted for reciprocation in an air cylinder 44.

Thus the neck ring and parison held therein may be transferred from the parison mold to the blow mold, and returned beneath the parison mold in response to suitably controlled applications and exhaust of compressed air to the cylinder 44. The times of such application and exhaust of air may be determined and controlled by suitable timing means, as for instance, that shown in the aforesaid British patent. The speed of operation of the rack 42 and hence of the transfer movement may be regulated by suitable check valves associated with the cylinder 44 and its air connections, such for example, as the valve 53.

The inversion of the parison is accomplished partly by the transfer movement per se and partly through the crank 25, its connections, and the cam 32.

The cam 32 is removably mounted upon an extension 54 of one of the brackets 50, preferably by a bolt and slot connection 51, to permit adjustment of its angular position about the axis of transfer. The contour of the cam 32 is so selected as to give the desired turning movement to the neck ring within the arms 21 and 21', such that the compound of this movement and the transfer movement of the arms about the shaft 40 will cause an inversion of the parison about a center, the locus of which is near the path of the center of mass of the parison during inversion. The contour and position of the cam 32 may be selected to affect the inversion of the blank at any desired point in its transfer from the parison mold to the blow mold. They should, however, be so selected as to keep the locus of the center of inversion of the blank closely adjacent to the path of the center of mass of the parison, as such an arrangement tends to reduce the distortion of the parison.

A preferred form of operation of transfer and inversion mechanism provides for the prompt inversion of the parison near the beginning of the transfer movement after which the combined movements of the arms 21 and 21' and of the crank 25 are such as to maintain the parison in vertical position throughout the remainder of the transfer movement. This provision gives a substantial period of elongation and reheating of the parison while it is out of contact with both molds.

As stated, the link 27 is made of two pieces provided with registering slots, and fastened together by bolts 52 passing therethrough. This provision permits adjustment of the length of the link 27 which assures proper alignment of the neck ring and parison mold.

The operation of a bottle forming machine equipped with my invention may be as follows: With the parts shown in the full line positions of Fig. 1 in which the closed neck ring is located beneath the closed parison mold 13, a suitable charge of glass is supplied to the parison mold, preferably from an automatic feeder and properly guided into the mold by a suitable guiding means. A blowhead, such as is described for that purpose in the aforesaid British patent, is applied to the upper portion of the parison mold and the charge is settle-blown, the glass being forced down into the neck ring and around a neck pin to form the neck finish of the article. The settle blowhead is then withdrawn and a suitable bottom plate is applied to the parison mold, or, as is shown in the aforesaid British patent, the settle blowhead may be also usable as a bottom plate and may be raised only for the purpose of permitting the removal of the funnel by which the charge of glass was guided into the mold and with which the combined settle blowhead and counterblow bottom plate cooperated in settle blowing the charge. Compressed air is then supplied through the counterblow mechanism 18 to form the parison. Following this, the halves of the parison mold 13 are opened and the transfer is begun by the application of compressed air above the piston 43.

As the movement of the neck ring arms 21 and 21' proceeds, the cam roll 33 following the cam 32 causes a turning movement of the crank 25. The movement of transfer and the movement of the crank cooperate to cause inversion of the neck ring and the parison supported thereby. This movement, as stated, is such that the tendency to distortion of the parison is minimized. The parison is completely inverted at a suitable position in the path of transfer as is indicated at T, Fig. 1. In this position, the parison "reheats", that is, the heat of the parison is equalized by the transfer of the heat within the parison to the outer surface which has been chilled by contact with the parison mold.

The parison also undergoes elongation by gravity. After the complete inversion of the parison, the cam roll 33 follows a contour of the cam 32 such that the crank arm 25 is given a movement compensating for the movement of the arms 21 and 21', so that the parison is maintained in its upright vertical position and in this position is carried between the two halves of the open blow mold. The blow mold is then closed about the suspended parison, whereupon compressed air is applied through the passages 48 and 49 to the heads of the piston 39, which forces the cylinders 38 outwardly against the pressure of the springs 46 and causes an opening of the neck ring halves, thus releasing the parison. The return movement of the neck ring then takes place. At a suitable point after the neck ring has cleared the top finish of the parison, the air is exhausted from the cylinders 38, which permits the neck ring halves to be closed under the pressure of the springs 46 and the closed neck ring is thus returned to its initial position below the parison mold 13, whereupon the mold halves of the parison mold are closed. Meanwhile a suitable blowhead, such as that described in the aforesaid British patent, is applied to the blow mold and the parison is blown to final form, preferably while a second parison is being formed in the blank mold.

It is obvious that the apparatus embodying my invention may be modified in numerous ways without departing from the spirit of my invention, as expressed in the following claims.

I claim as my invention:

1. In a glass bottle forming machine, a divided parison mold and a divided blow mold mounted respectively in neck-down and neck-up positions, a combined neck ring and transfer mechanism adapted to cooperate with both of said molds, means for moving the neck ring from a position below the parison mold to a position above the blow mold including a pair of neck ring carriers, means for rotating the carriers about a horizontal axis, and means for rotating the neck ring within said carriers during the rotation of the carriers.

2. In a glass bottle forming machine in combination, a parison mold mounted in neck-down position and a blow mold mounted in neck-up position in spaced relation to the parison mold, a neck ring carrier adapted for rotation about a horizontal axis intermediate the said molds, a neck ring mounted for rotation with respect to said carrier, means for opening and closing said neck ring, means for rotating the carrier to transfer the neck ring from a position below the parison mold to a position above the blow mold, and means cooperating with the neck ring carrier for inverting the neck ring by an angular movement with respect to said carrier during a part of the transfer movement and for thereafter maintaining it in a position to maintain a parison held therein upright during the remainder of the transfer movement.

3. In a glassware forming machine in combination, a parison mold and a blow mold spaced therefrom arranged respectively in neck-down and neck-up positions, a divided neck ring adapted to cooperate with said molds, means for moving the neck ring from a position below the parison mold to a position above the blow mold, means for opening and closing the neck ring, and means for inverting the neck ring during a part of its movement from a position below the blank mold to a position above the blow mold and prior to the completion of such movement and for maintaining the neck ring in a position to maintain a parison held therein upright thereafter during the transfer.

4. In a bottle forming machine in combination, a parison mold mounted in neck-down position and a blow mold mounted in neck-up position, said molds being fixed relatively to each other, a neck ring adapted to cooperate with the parison mold in the formation of the parison and to transfer such parison to the blow mold, a carrier movably supporting the neck ring and mounted for movement about a horizontal axis intermediate the molds, means for moving the carrier, and means associated with the carrier for inverting the neck ring by an angular movement with respect to said carrier during the transfer movement.

5. In a bottle machine in combination with a parison mold mounted in neck-down position and a blow mold mounted in neck-up position, means for transferring a parison formed in the parison mold to the blow mold, comprising means for moving the parison about a horizontal pivot spaced from the parison, and means for rotating the parison about a second pivot spaced from but parallel to the first named pivot during its movement about the first named pivot, the two movements effecting a reversion of the parison about a center, the locus of which is adjacent to the path of the center of mass of the parison.

6. In a bottle machine in combination with a parison mold mounted in neck-down position and a blow mold mounted in neck-up position, a divided neck ring adapted to cooperate with the parison mold to form a glass parison and to support the parison, so formed, during its transfer to the blow mold, offset carriers for said neck ring pivoted at their ends opposite the neck ring for oscillation about a horizontal axis, means for oscillating the carriers about said axis, means for rotating the neck ring within said carriers during the oscillation of the carriers, and means for opening and closing the neck ring.

7. In a bottle forming machine in combination, a divided parison mold mounted in neck-down position, a divided blow mold mounted in neck-up position, said molds being spaced apart and fixed relatively one to the other, a parison transferring mechanism comprising a pair of offset carriers pivoted at one end for rotation about a horizontal axis intermediate the molds, a pair of neck ring halves mounted in the other end of the carriers for rotation about a second horizontal axis, said neck ring being adapted to cooperate with the parison mold to form parisons and to support said parisons during their transfer to the blow mold, means for oscillating the carriers to transfer the parisons from the parison mold to the blow mold, means to open and close the neck ring, and means for rotating the neck ring and supported parison about the second axis during the movement of the carriers around the first axis, said means including a crank, a cam roll and a cam coacting upon the movement of the carriers to cause such rotation about the second axis.

8. The method of transferring and inverting a parison formed in an inverted parison mold and neck ring to a blow mold arranged in neck-up position, which comprises supporting the formed parison in the neck ring, giving the neck ring a movement of rotation about one horizontal axis from a position below the parison mold to a position above the blow mold, and rotating the neck ring about a second axis passing through the neck ring during its movement about the first axis.

9. The method of transferring a glass parison formed in an inverted parison mold to a reverted blow mold, which comprises supporting the formed parison in neck-down position in a neck ring, moving the neck ring in an arc about an axis externally of the neck ring, rotating the neck ring about an axis passing through the neck ring during its movement about the first axis, the compound movement about the two axes first causing a reversion of the parison during one portion of its movement about the first axis, and thereafter maintaining the parison in its reverted position, thereby first reverting the parison about a moving axis, the locus of the center of which is adjacent to the path of movement of the center of mass of the parison and thereafter permitting the parison to reheat and elongate in a vertical position during its transfer to the blow mold.

10. Apparatus for handling glass articles, comprising an arm mounted to oscillate between an article receiving station and an article delivery station, article gripping means mounted for pivotal movement adjacent to one end of said arm, means to oscillate said arm between the receiving and delivery stations, means to control the angular relation between said arm and said article gripping means including a stationary cam, a follower for said cam, and means connecting said follower both with said arm and said gripping means.

11. Apparatus for transferring glass articles from a receiving station to a delivery station, comprising an arm mounted for swinging movement about a horizontal axis disposed midway between said stations, means for swinging said arm between said stations, article gripping means pivotally connected to a point on said arm remote from its axis of swing, a stationary cam, and means including a follower for said cam for controlling the angular relations between said arm and said gripping means throughout the swing of said arm.

12. Apparatus for transferring glass articles from a receiving station to a delivery station, comprising an arm mounted for swinging movement about a horizontal axis disposed midway between said stations, means for swinging said arm between said stations, article gripping means pivotally connected to a point on said arm remote from its axis of swing, a stationary cam, and means including a follower for said cam for controlling the angular relations between said arm and said gripping means, the cam being shaped to cause the inversion of said gripping means during the first portion of the movement of said arm from the receiving station to the delivery station, and thereafter to cause the gripping means to return to its initial angular relation with respect to said arm by the same angular movement as the angular movement of said arm for the remainder of its swing.

13. In a glass bottle forming machine, a divided parison mold and a divided blow mold mounted respectively in neck-down and neck-up positions, a combined neck ring and transfer mechanism adapted to cooperate with both of said molds, means for moving the neck ring from a position below the parison mold to a position above the blow mold including a pair of neck ring carriers movably supporting said neck rings, means for rotating the carriers about a horizontal axis, and means including a stationary cam for controlling and varying the angular position of the neck ring with respect to said carriers throughout at least a part of the rotation of said carriers.

14. In a glass bottle forming machine, a divided parison mold and a divided blow mold mounted respectively in neck-down and neck-up positions, a combined neck ring and transfer mechanism adapted to cooperate with both of said molds, means for moving the neck ring from a position below the parison mold to a position above the blow mold including a pair of neck ring carriers movably supporting said neck rings, means for rotating the carriers about a horizontal axis, and means including a stationary cam for controlling and varying the angular position of the neck ring with respect to said carriers throughout at least a part of the rotation of said carriers, said cam having a configuration such that the neck ring will be inverted by an angular movement with respect to said carrier during the first part of its movement from the parison mold to the blow mold, and will be moved in the reverse direction with respect to the carriers and at the same angular speed throughout the remainder of the said movement of the carriers, whereby a parison held in the neck ring will be inverted during the first portion of its transfer movement and will be held upright during the remainder thereof.

15. In a glass bottle forming machine, a divided parison mold and a divided blow mold disposed respectively in neck-down and neck-up positions, an arm mounted to oscillate between said molds, means pivotally mounted on said arm for gripping a parison formed in said parison mold, means to oscillate said arm and said parison gripping means to transfer parisons successively from said parison mold to said blow mold, means including a cam for controlling and varying the angular relation between said arm and said gripping means during the transfer of said parisons, and means for varying the position of said cam to change the characteristics of the transfer movement.

16. In a bottle forming machine in combination, a parison mold mounted in neck-down position and a blow mold mounted in neck-up position, said molds being fixed relatively to each other, a neck ring adapted to cooperate with the parison mold in the formation of the parison and to transfer such parison to the blow mold, a carrier for the neck ring adapted for movement about a horizontal axis intermediate the molds, means for moving the carrier, and adjustable means associated with said carrier for completely inverting the neck ring during a selected portion of the transfer movement.

17. The method of transferring and inverting a parison formed in an inverted parison mold and neck ring to a blow mold arranged in neck-up position, which comprises supporting the formed parison in the neck ring, giving the neck ring a movement of rotation about one horizontal axis from a position below the parison mold to a position above the blow mold, and rotating the neck ring about a second axis passing through the neck ring during a selected portion of its movement about the first axis.

18. The method of transferring and inverting a parison formed in an inverted parison mold and neck ring to a blow mold arranged in neck-up position, which comprises supporting the formed parison in the neck ring, giving the neck ring a movement of rotation about one horizontal axis from a position below the parison mold to a position above the blow mold, rotating the neck ring through an angle of 180° about a second axis passing through the neck ring during a first portion of the movement of said neck ring about the first axis, and maintaining the neck ring and parison carried thereby in a position such that the parison will be upright during the remainder of the movement of the neck ring about the first axis.

19. The method of forming hollow a glass article comprising the steps of supplying a charge of glass to an inverted parison mold, forming the charge into a parison in said parison mold, transferring the parison thus formed to a blow mold disposed in neck-up position by a movement including a first part in which the parison is moved part way from the parison mold to the blow mold and simultaneously completely inverted and a second part in which the now upright parison is given time to reheat and elongate by gravity while moving the remainder of the distance to the blow mold, and blowing the reheated and elongated parison to final form in the blow mold.

20. The method of forming hollow a glass article comprising the steps of supplying a charge of glass to an inverted parison mold, forming the charge into a parison in said parison mold, transferring the parison thus formed to a blow mold disposed in neck-up position by a movement including a first part in which the parison is moved part way from the parison mold to the blow mold and simultaneously completely inverted and a second part in which the now upright parison is given time to reheat and elongate by gravity while moving the remainder of the distance to the blow mold, varying the time of completion of the inverting operation of parison to control its elongation by gravity, and blowing the reheated and elongated parison to final form in the blow mold.

21. The method of forming hollow a glass article comprising the steps of supplying a charge of glass to an inverted parison mold, forming the charge into a parison in said parison mold, transferring the parison thus formed to a blow mold disposed in neck-up position by a movement including a first part in which the parison is moved part way from the parison mold to the blow mold and simultaneously completely inverted and a second part in which the now upright parison is given time to reheat and elongate by gravity while moving the remainder of the distance to the blow mold, varying to rate of the entire transfer movement of the parison to control the time for reheat, and blowing the reheated and elongated parison to final form in the blow mold.

Signed at Hartford, Conn., this 26th day of December, 1928.

HAROLD A. WADMAN.